(12) United States Patent
Guthrie et al.

(10) Patent No.: US 10,108,464 B2
(45) Date of Patent: Oct. 23, 2018

(54) MANAGING SPECULATIVE MEMORY ACCESS REQUESTS IN THE PRESENCE OF TRANSACTIONAL STORAGE ACCESSES

(71) Applicant: INTERNATIONAL BUSINESS MACHINES CORPORATION, Armonk, NY (US)

(72) Inventors: Guy L. Guthrie, Austin, TX (US); Hugh Shen, Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 14/311,429

(22) Filed: Jun. 23, 2014

(65) Prior Publication Data
US 2015/0242251 A1    Aug. 27, 2015

Related U.S. Application Data

(63) Continuation of application No. 14/192,179, filed on Feb. 27, 2014.

(51) Int. Cl.
*G06F 12/02* (2006.01)
*G06F 9/50* (2006.01)
(Continued)

(52) U.S. Cl.
CPC .......... *G06F 9/5088* (2013.01); *G06F 9/5033* (2013.01); *G06F 9/528* (2013.01); *G06F 12/0815* (2013.01); *G06F 12/0862* (2013.01); *G06F 12/1072* (2013.01); *G06F 12/1491* (2013.01); *G06F 2212/507* (2013.01); *G06F 2212/602* (2013.01); *G06F 2212/6026* (2013.01)

(58) Field of Classification Search
None
See application file for complete search history.

(56) References Cited

U.S. PATENT DOCUMENTS

| 6,654,860 B1 | 11/2003 | Strongin et al. |
| 7,089,374 B2 | 8/2006 | Tremblay et al. |

(Continued)

OTHER PUBLICATIONS

Guthrie et al., U.S. Appl. No. 14/192,179, filed Feb. 27, 2014, Non-Final Office Action dated Aug. 28, 2015.

(Continued)

*Primary Examiner* — Charles Rones
*Assistant Examiner* — Ryan Dare
(74) *Attorney, Agent, or Firm* — Brian F. Russell; Steven L. Bennett

(57) ABSTRACT

In at least some embodiments, a cache memory of a data processing system receives a speculative memory access request including a target address of data speculatively requested for a processor core. In response to receipt of the speculative memory access request, transactional memory logic determines whether or not the target address of the speculative memory access request hits a store footprint of a memory transaction. In response to determining that the target address of the speculative memory access request hits a store footprint of a memory transaction, the transactional memory logic causes the cache memory to reject servicing the speculative memory access request.

14 Claims, 13 Drawing Sheets

(51) Int. Cl.
*G06F 9/52* (2006.01)
*G06F 12/1072* (2016.01)
*G06F 12/14* (2006.01)
*G06F 12/0815* (2016.01)
*G06F 12/0862* (2016.01)

(56) References Cited

U.S. PATENT DOCUMENTS

| | | | |
|---|---|---|---|
| 8,621,478 | B2 | 12/2013 | Ahn et al. |
| 8,868,837 | B2 | 10/2014 | Gara et al. |
| 2003/0105943 | A1 | 6/2003 | Yeh et al. |
| 2004/0187123 | A1* | 9/2004 | Tremblay ............... G06F 9/467 718/100 |
| 2007/0156994 | A1 | 7/2007 | Akkary et al. |
| 2008/0104335 | A1 | 5/2008 | Cypher et al. |
| 2009/0083488 | A1 | 3/2009 | Madriles Gimeno et al. |
| 2011/0219188 | A1 | 9/2011 | Blumrich et al. |
| 2011/0219215 | A1 | 9/2011 | Blumrich et al. |
| 2013/0013899 | A1 | 1/2013 | Barton et al. |
| 2013/0019083 | A1* | 1/2013 | Cain, III ............. G06F 11/1492 712/203 |
| 2013/0339327 | A1* | 12/2013 | Belmar ............ G06F 17/30371 707/703 |
| 2014/0013055 | A1 | 1/2014 | Frey et al. |

OTHER PUBLICATIONS

Guthrie et al., U.S. Appl. No. 14/192,179, filed Feb. 27, 2014, Final Office Action dated May 23, 2016.
Guthrie et al., U.S. Appl. No. 14/192,179, filed Feb. 27, 2014, Advisory Action dated Sep. 22, 2016.
Guthrie et al., U.S. Appl. No. 14/192,179, filed Feb. 27, 2014, Non-Final Office Action dated Nov. 4, 2016.
Guthrie et al., U.S. Appl. No. 14/192,179, filed Feb. 27, 2014, Non-Final Office Action dated Jun. 6, 2017.
Guthrie et al., U.S. Appl. No. 14/192,179, filed Feb. 27, 2014, Non-Final Office Action dated Feb. 14, 2018.
Guthrie et al., U.S. Appl. No. 14/192,179, filed Feb. 27, 2014, Notice of Allowance dated Aug. 24, 2018.

* cited by examiner

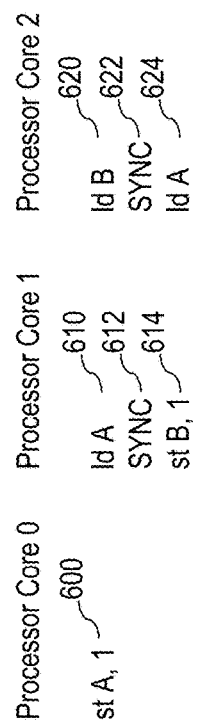
tbegin —502
beq fail_handler —504
ld A —510
ld B
{ tsuspend
ld C
ld D —512
st E —514
tresume
st F
ld G —508
tend
506
*Figure 5*
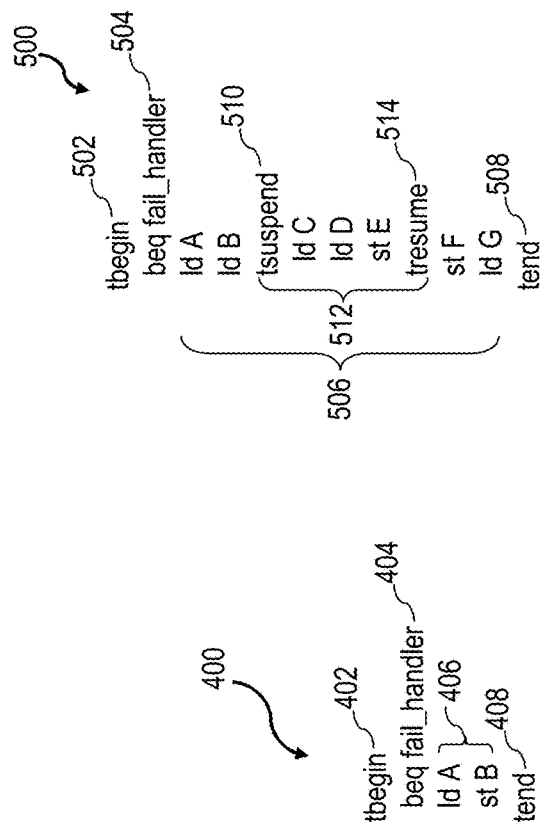
tbegin —402
beq fail_handler —404
ld A —406
st B
tend —408
*Figure 4*
Processor Core 0 —600    Processor Core 1    Processor Core 2
st A, 1                  ld A —610           ld B —620
                         SYNC —612           SYNC —622
                         st B, 1 —614        ld A —624
*Figure 6A*

Processor Core 0
tbegin —632
st A, 1 —634
tend —636
} 630

Processor Core 1
tbegin
ld A —642
st B, 1
tend
} 640

Processor Core 2
tbegin
ld B —652
ld A —654
tend
} 650

*Figure 6B*

Processor Core 0
st A, 1 —660

Processor Core 1
tbegin
ld A
st B, 1
tend
} 670
672
674
676

Processor Core 2
ld B —680
SYNC —682
ld A —684

*Figure 6C*

MANAGING SPECULATIVE MEMORY ACCESS REQUESTS IN THE PRESENCE OF TRANSACTIONAL STORAGE ACCESSES

PRIORITY CLAIM

This application is a continuation of U.S. patent application Ser. No. 14/192,179 entitled "MANAGING SPECULATIVE MEMORY ACCESS REQUESTS IN THE PRESENCE OF TRANSACTIONAL STORAGE ACCESSES," filed on Feb. 27, 2014, the disclosure of which is incorporated herein by reference in its entirety for all purposes.

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower-level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—as the transaction executes for conflicts. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

In at least some embodiments, a cache memory of a data processing system receives a speculative memory access request including a target address of data speculatively requested for a processor core. In response to receipt of the speculative memory access request, transactional memory logic determines whether or not the target address of the speculative memory access request hits a store footprint of a memory transaction. In response to determining that the target address of the speculative memory access request hits a store footprint of a memory transaction, the transactional memory logic causes the cache memory to reject servicing the speculative memory access request.

BRIEF DESCRIPTION OF THE SEVERAL VIEWS OF THE DRAWINGS

FIG. 4 is an illustrative example of a memory transaction in accordance with one embodiment;

FIG. 5 is an illustrative example of a memory transaction including a suspended region in accordance with one embodiment;

FIG. 6A depicts execution of an exemplary program illustrating causality in a multiprocessor data processing system;

FIG. 6B illustrates execution of an exemplary program including memory transactions to ensure causality;

FIG. 6C depicts execution of an exemplary program including both transactional and non-transactional memory accesses;

DETAILED DESCRIPTION

Figure 1:
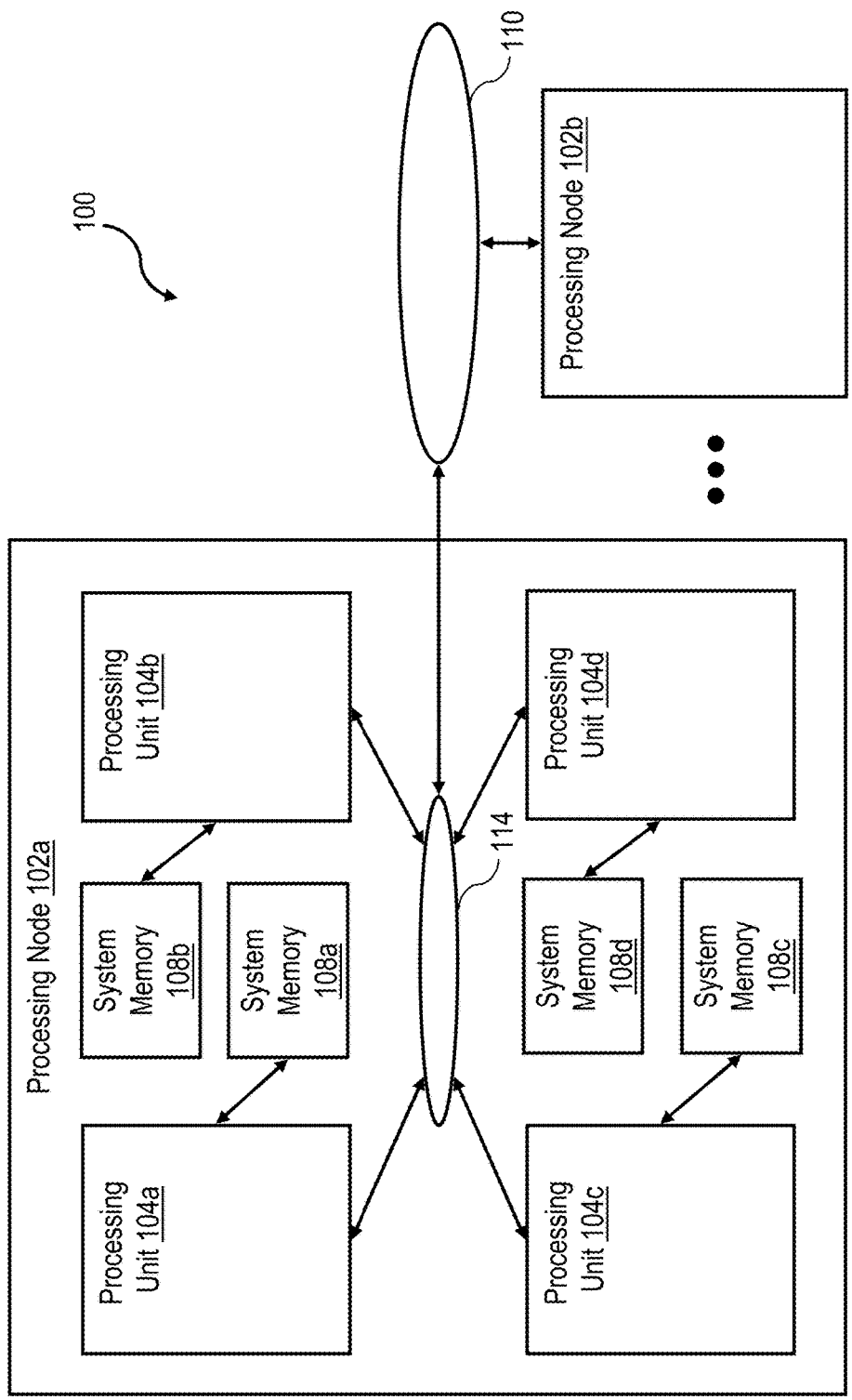
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model, so called "barrier" (e.g., SYNC) instructions are typically provided to allow the programmer to specify what memory access operation orderings and atomicity are to be applied during execution of the multi-processor program.

Figure 2:
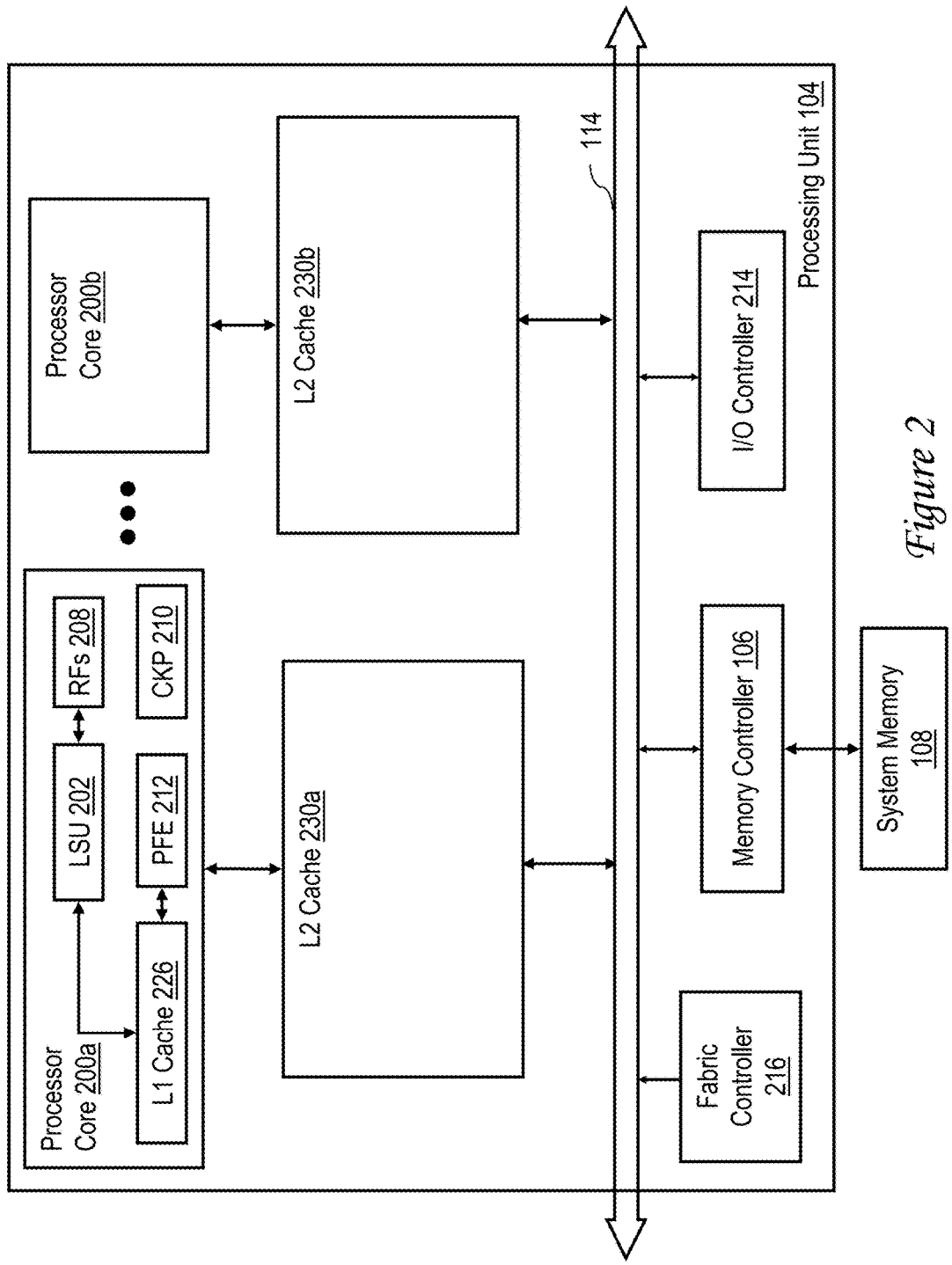
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two or more processor cores 200a, 200b for processing instructions and data. In a preferred embodiment, each processor core 200 is capable of independently executing multiple hardware threads of execution simultaneously. However, in the following description, unless the interaction between threads executing on a same processor core is relevant in a particular context, for simplicity, terms "processor core" and "thread executing on a processor core" are used interchangeably. As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 130 for each processor core 200a, 200b. In order to efficiently handle multiple concurrent memory access requests to cacheable addresses, each L2 cache 130 can be implemented with multiple L2 cache slices, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 130 for servicing.

It will also be appreciated by those skilled in the art that access latency can be improved by prefetching data that is likely to accessed by a processor core 200 into one or more levels of the associated cache hierarchy in advance of need. Accordingly, processing unit 104 can include one or more prefetch engines, such as prefetch engine (PFE) 212, that generate prefetch load requests based on historical demand access patterns of processor cores 200. Prefetch load requests generated by PFE 212 are inherently speculative in that they are generated prior to, and in expectation of, a subsequent demand access request generated through the execution of a memory access instruction by LSU 202.

Figure 3:
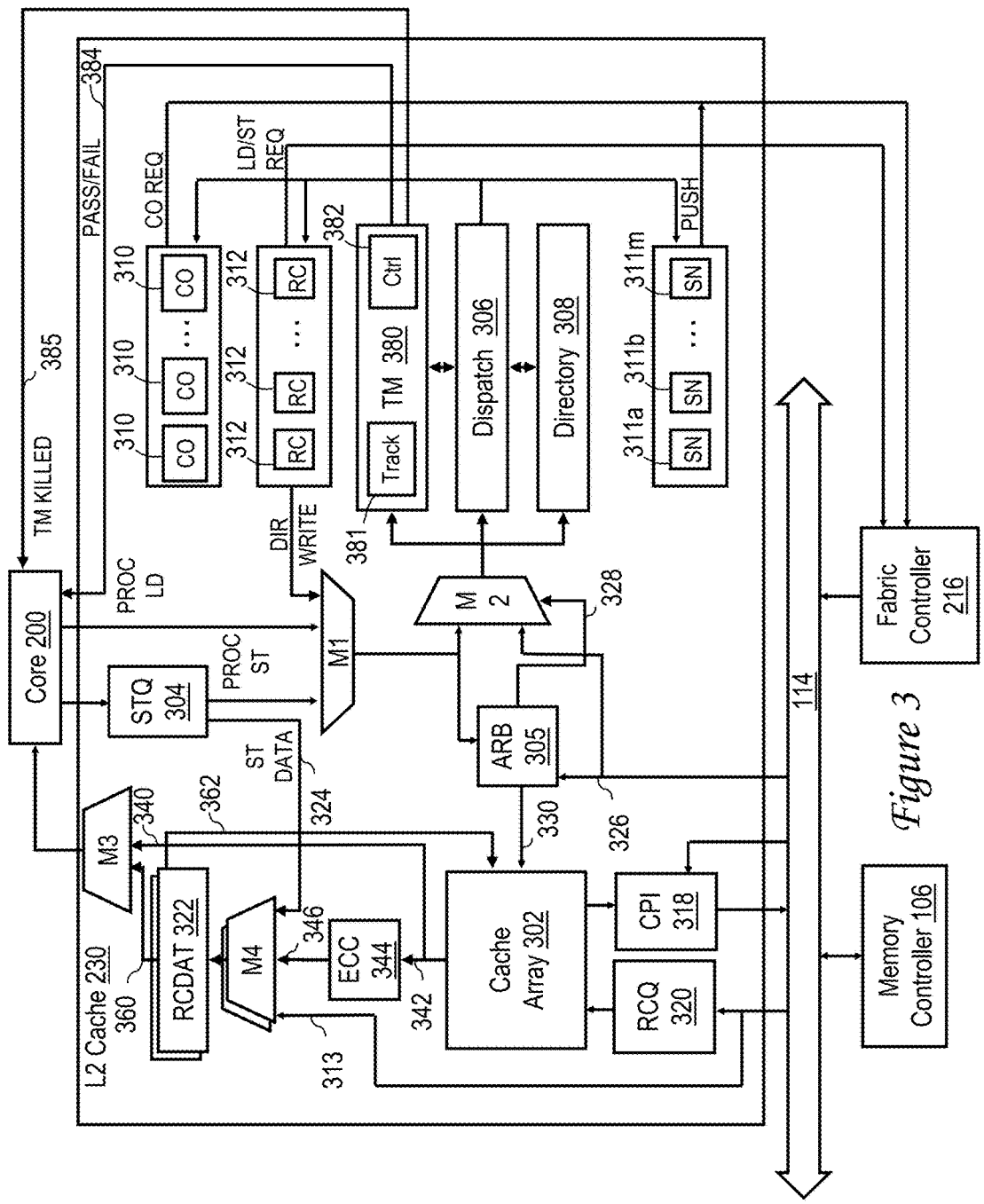
FIG. 3 is a detailed block diagram of lower level cache supporting memory transactions in accordance with one embodiment.

With reference now to FIG. 3, there is illustrated a more detailed block diagram of an exemplary embodiment of a lower level cache (e.g., an L2 cache 130) that supports memory transactions in accordance with one embodiment. As shown in FIG. 3, L2 cache 130 includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, an LRU (Least Recently Used) field indicating a replacement order for the cache line with respect to other cache lines in the same congruence class, and inclusivity bits indicating whether the memory block is held in the associated L1 cache 226.

L2 cache 130 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 130 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 130 also includes CO (castout) machines 310 that manage the removal and writeback of memory blocks from cache array 302.

L2 cache 130 further includes an arbiter 305 that controls multiplexers M1-M2 to order the processing of local memory access requests and memory transaction requests (corresponding to the tbegin, tbegin_rot, tend, tabort, and tcheck instructions described further herein) received from the affiliated processor core 200 and remote requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each read/load and store request with respect to directory 308 and cache array 302. As described further below, transactional memory (TM) logic 380 processes memory transaction requests and tracks memory access operations within memory transactions to ensure completion of the memory access operations in an atomic manner or to abort the memory transactions in the presence of conflicts.

L2 cache 130 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Each RC machine 312 also has assigned to it a respective one of multiple RC data (RCDAT) buffers 322 for buffering a memory block read from cache array 302 and/or received from local interconnect 114 via reload bus 313. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

The request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in directory 308, and if the memory address hits, the coherency state of the target memory block. The directory information, which includes a hit/miss indication and the coherency state of the memory block, is returned by directory 308 to dispatch pipeline 306 in a subsequent cycle. As will be appreciated, no action is generally taken within an L2 cache 130 in response to miss on a remote memory access request; such remote memory requests are accordingly discarded from dispatch pipeline 306. However, in the event of a hit or miss on a local memory access request or a hit on a remote memory access request, L2 cache 130 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of directory 308, if necessary. In addition, the RC machine 312 may perform a cache write to update the relevant cache line of cache array 302. Directory writes 408a, 408b and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 313, store data multiplexer M4, RCDAT buffer 322 (with store merge for a store miss) and data path 362.

Referring now to FIG. 4, an illustrative example of a memory transaction is depicted. Those skilled in the art will recognize that the particular semantics and instructions utilized to implement the various memory transactions described herein are but some of the numerous possible implementations and that the disclosed techniques of implementing transactional memory are not dependent on the specific instructions and instruction semantics employed.

Illustrative memory transaction 400 begins at tbegin instruction 402. Tbegin instruction 402 initiates memory transaction 400, causes the processor core 200 executing tbegin instruction 402 to take a checkpoint 210 of the architected register state of processor core 200, and (e.g., through a corresponding tbegin request sent to the affiliated L2 cache 130) invokes tracking of load and store instructions within the transaction body 406 to ensure they complete in an atomic fashion or that memory transaction 400 fails in the presence of a conflict. Memory transaction 400 additionally includes a branch instruction 404 immediately following tbegin instruction 402. When memory transaction 400 first executes, the condition code register in processor core 200 upon which branch instruction 404 depends is initialized to a value that causes the program branch indicated by branch instruction 404 not to be taken and the flow of execution to continue to transaction body 406. As discussed below, in response to failure of memory transaction 400, the condition code register is set to a different value, and branch instruction 404 causes execution to branch to a fail handler routine.

In the exemplary embodiment depicted in FIG. 3, TM logic 380 tracks transactional memory access (e.g., load and store) instructions within transaction body 406 to ensure that they complete in an atomic fashion or that memory transaction 400 fails in the presence of a conflict. In particular, TM tracking logic 381 within TM logic 380 includes a number of entries that indicate which cache lines in cache array 302 are included in the transaction footprint (as described below, for example, with reference to FIG. 10). The transaction footprint includes two portions: the load footprint corresponding to cache lines touched solely by loads within transaction body 406 (e.g., the cache line at address A in exemplary memory transaction 400) and the store footprint corresponding to cache lines touched solely by store instructions or by both load and store instructions in transaction body 406 (e.g., the cache line at address B in exemplary memory transaction 400).

As further shown in FIG. 3, TM logic 380 further includes transactional control logic 382, which controls the sequencing of a memory transaction and provides a pass/fail indication 384 and an optional TM killed indication 385 to the associated processor core 200. Pass/fail indication 384 indicates to processor core 200 whether or not the memory transaction successfully committed to the distributed shared memory system at the execution of the tend instruction 408 at the end of memory transaction 400. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction 400 prior to reaching tend instruction 408.

In response to pass/fail indication 384 (or optionally TM killed indication 385) indicating that a conflict has occurred during execution of memory transaction 400, processor core 200 re-establishes its architected register state from the checkpoint 210 taken at the execution of tbegin instruction 402, invalidates the tentatively modified cache lines in the store footprint, releases tracking logic 381, sets the condition code register such that branch instruction 404 will be taken, and transfers control to branch instruction 404. In addition, processor core 200 sets a transaction failure cause register (not shown) in processor core 200 to indicate the cause of the memory transaction's failure. The fail handler routine invoked by branch instruction 404 may choose to re-attempt memory transaction 400 or fall back to more conventional locking mechanisms, optionally based on the content of the transaction failure cause register.

During the execution of a memory transaction, the values stored to the distributed shared memory system by transaction body 406 (i.e., those in the store footprint of the memory transaction) are visible only to the thread of the processor core 200 executing the memory transaction. Threads running on the same or other processor cores 200 will not "see" these values until and only if the memory transaction successfully commits.

For a memory transaction to successfully commit, the load and store instructions in transaction body 406 must complete in an atomic fashion (i.e., there must be no conflicts for the cache lines in the memory transaction's load and store footprints) and the effects of the store instructions in transaction body 406 must propagate to all processing units 104 in data processing system 100 and invalidate any cached copies of those cache lines held in other processing units 104. If both of these conditions hold when tend instruction 408 is executed, transactional control logic 382 indicates to processor core 200 via pass/fail indication 384 that memory transaction 400 passed and commits all stores performed in transaction body 406 to L2 cache 130, thus making them visible to all other threads and processor cores 200 in the system simultaneously.

Figure 12A:
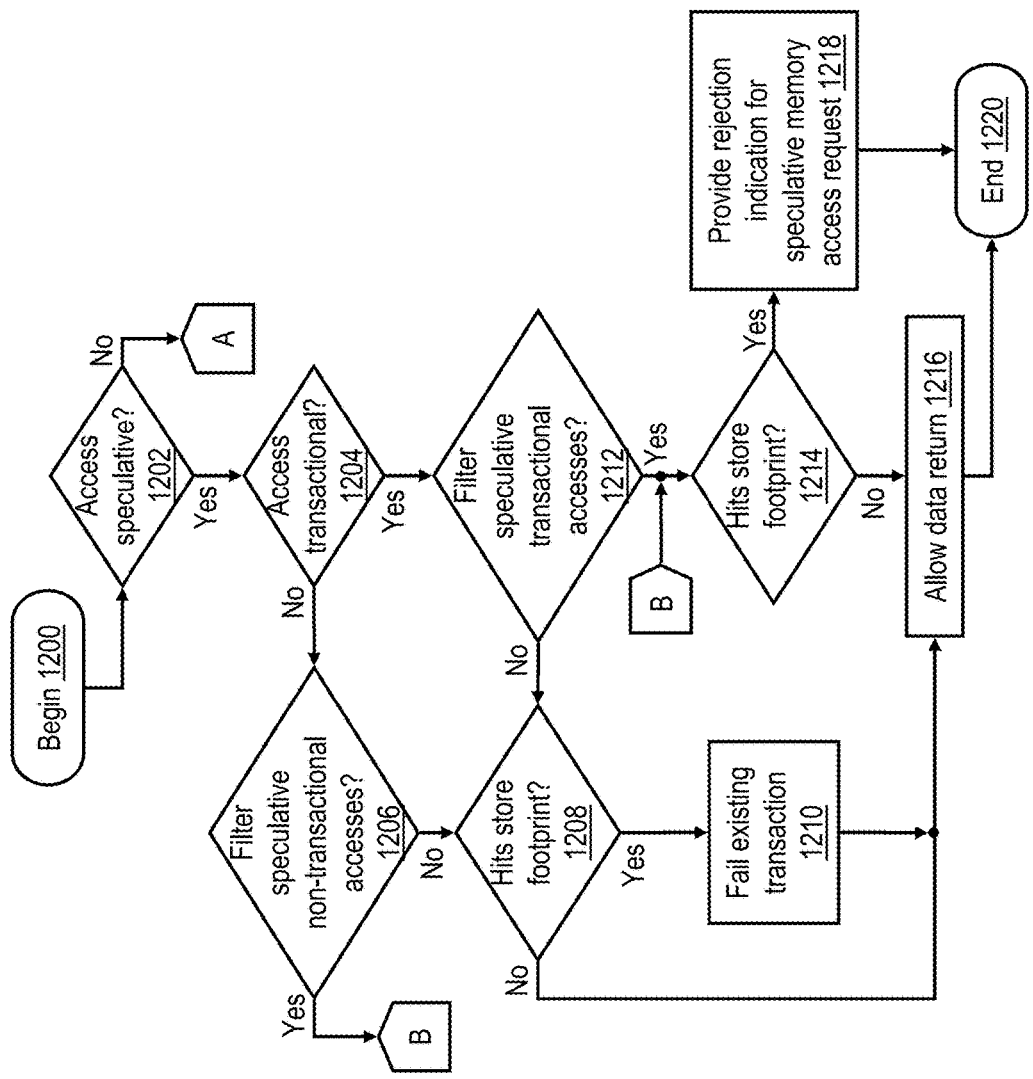
FIGS. 12A-12B together form a high level logical flowchart of an exemplary method by which collisions between memory access requests and memory transactions are detected and resolved in accordance with one embodiment.
Figure 12B:
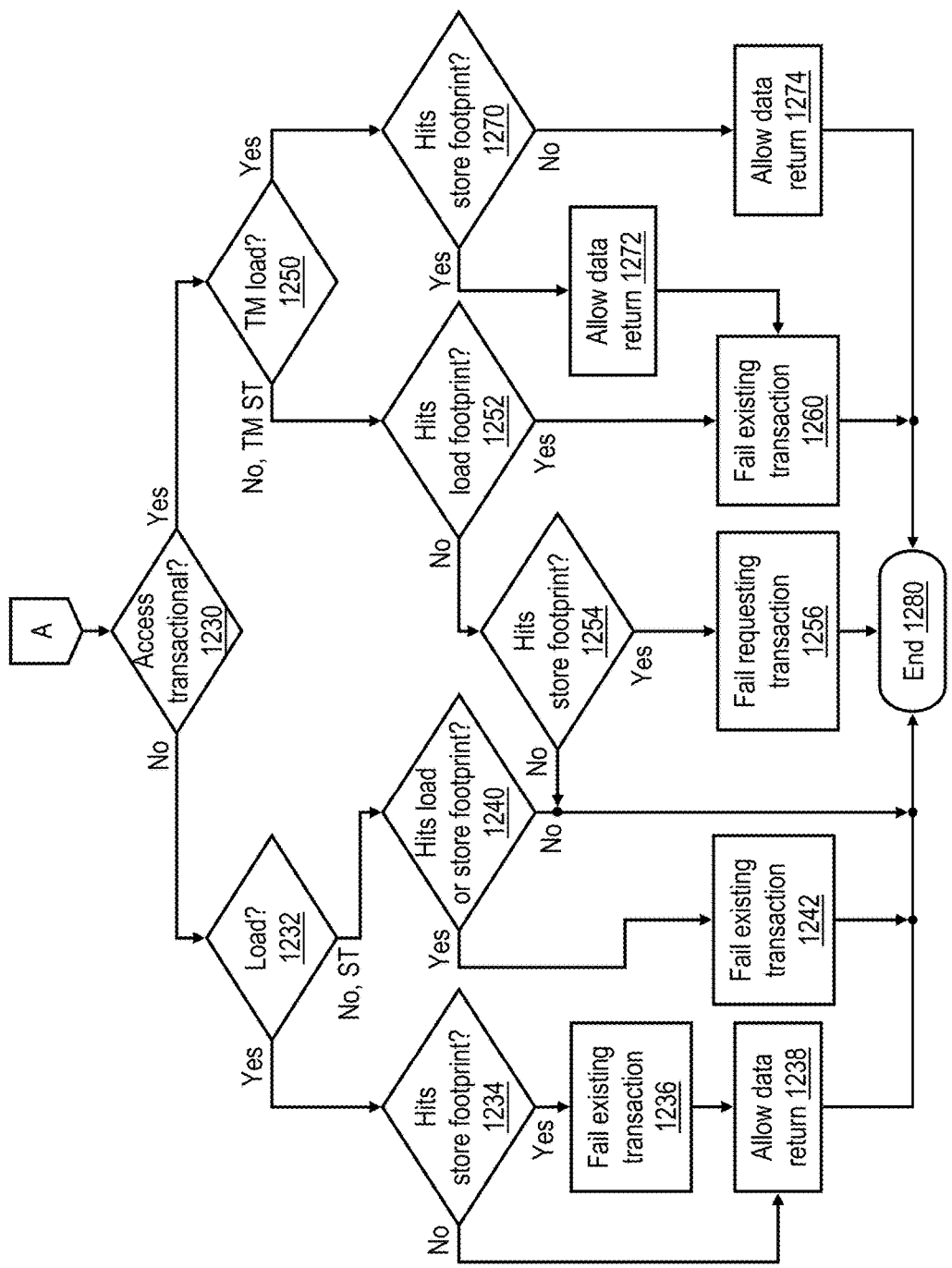

In the following discussion, a load or store instruction will be called "transactional" if that load or store instruction occurs within the transaction body 406 of a memory transaction 400. Similarly, a load or store will be called "non-transactional" if it occurs outside a transaction body 406. In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, the given memory transaction has a conflict if one of its transactional loads hits an address already extant in the store footprint of another processor core's memory transaction. In a fifth case, the given memory transaction has a conflict if one of its transactional stores hits an address already extant in the store footprint of another processor core's memory transaction. The above conflict policy biases in favor of transactional stores over transactional loads, while allowing transactional and non-transactional loads to freely intermingle. This exemplary conflict policy, a variant of which is described in greater detail below with reference to FIGS. 12A-12B, is but one of several possible embodiments.

With reference now to FIG. 5, there is illustrated a representative memory transaction 500 containing a suspended region. As can be seen by comparison of FIGS. 4 and 5, memory transaction 500 includes a tbegin instruction 502, branch instruction 504, transaction body 506 and tend instruction 508, which correspond to tbegin instruction 402, branch instruction 404, transaction body 406 and tend instruction 408 described above. In addition, memory transaction 500 includes a tsuspend instruction 510 that initiates the start of a suspended region 512. When a memory transaction is suspended through execution of tsuspend instruction 510, the load and store footprints currently established for the enclosing memory transaction containing suspended region 512 remain in place and continue to be tracked by TM tracking logic 381 for conflicts. However, any load or store instructions within suspended region 512 are treated as non-transactional loads and stores and follow existing semantics for such loads and stores. In particular, stores within suspended region 512 are non-transactional and will commit and begin propagating to other processors unconditionally. If a store within suspended region 512 hits either the load or the store footprint of the enclosing memory transaction, a conflict occurs (which also destroys the tentative transactional version of the cache line in the store footprint) and is logged by transactional control logic 382. However, this conflict is not acted on until the enclosing memory transaction is resumed upon execution of tresume instruction 514, at which point the processor core 200 passes control to branch instruction 504 as described. If a non-transactional load instruction within suspended region 512 hits a cache line within the store footprint of the enclosing memory transaction 500, that load instruction returns the tentatively updated value written by a transactional store within the transaction body 506 unless that value has been overwritten by a non-transactional store either by another processor core 200 or by a non-transactional store in suspended region 512, in which case the non-transactional load instruction returns the current value of the target location.

Use of a suspended region 512 allows the temporary suspension of a memory transaction, which permits store instructions in the suspended region 512 to unconditionally update locations in the distributed shared memory system while also allowing for the resumption of the memory transaction at a later time. One possible use for a suspended region 512 is to log debug information into a scratchpad region of the distributed shared memory system and then to resume the enclosing memory transaction. Without a suspended region, the write of the debug information would be rolled back any time the enclosing memory transaction is aborted.

Referring now to FIG. 6A, the execution of an exemplary program illustrating the property of causality in a multiprocessor data processing system is shown. As used herein "causality," which is desirable property in multiprocessor programs, is defined as being preserved if, during execution of a multiprocessor program, a given thread of execution cannot read the effects of a computation before the writes that caused the computation can be read by the given thread.

In the simplified example given in FIG. 6A (as well as those discussed below with reference to FIGS. 6B-6C), a multiprocessor program is executed by three processor cores 200 of data processing system 100, labeled for ease of reference as processor core 0, processor core 1 and processor core 2. In FIG. 6A, processor core 0 executes a store instruction 600 that writes a value of 1 to address A in the distributed shared memory system. This update of address A propagates to processor core 1, and load instruction 610 executed by processor core 1 therefore returns a value of 1. Even though the memory update made by store instruction 600 has propagated to processor core 1, that memory update may not yet have propagated to processor core 2. If store instruction 614 executes on processor 1 and the associated memory update propagates to processor 2 before the memory update of store instruction 600 propagates to processor 2, causality would be violated because the store of the value of 1 to address B, which is an effect of the store to address A, would be visible to processor core 2 before the memory update associated with causal store instruction 600 was visible to processor core 2.

To ensure causality in a weak consistency memory model, barrier instruction 612 (e.g., a SYNC) ensures that store instruction 614 does not take effect or begin propagating its memory update to other processor cores until load instruction 610 has bound to its value. In addition, barrier instruction 612 also ensures that the memory update associated with store instruction 600 propagates to processor 2 before the memory update associated with store instruction 614. Thus, causality is preserved because the cause of the computation (i.e., the memory update of store instruction 600) is visible to processor core 2 before the result of the computation (i.e., the memory update of store 614). A barrier instruction 622 is also executed by processor core 2 to ensure that processor core 2 executes load instructions 620 and 624 and binds their values in order, thus guaranteeing that processor core 2 properly observes the memory updates made by processor core 0 and processor core 1.

With reference now to FIG. 6B, an exemplary embodiment of the multiprocessor program of FIG. 6A rendered in terms of memory transactions is illustrated. In FIG. 6B, the branch instructions to the memory transaction fail handler are omitted for clarity.

As illustrated, processor core 0 executes a memory transaction 630 including a tbegin instruction 632, tend instruction 636, and a transaction body including a store instruction 634 that stores a value of 1 to address A. Upon the execution of tend instruction 636, memory transaction 600 successfully commits and makes the update to address A visible to all the other processor cores simultaneously. In particular, by the time load instruction 642 of the memory transaction 640 executing on processor core 1 can read the value of 1 from address A, load instruction 654 of the memory transaction 650 executing on processor core 2 must also be able to read the value of 1 for address A. Memory transaction 640 then reads the value of 1 for address A, stores a value of 1 to address B and successfully commits. Finally, load instruction 652 of memory transaction 650 reads a value of 1 for address B, and given that memory transaction 640 read a value of 1 for A, load instruction 654 must also read a value of 1 for address A.

In order to make the memory updates of store instructions in a successful transaction visible to all other processor cores simultaneously, before that memory transaction can commit all the cache line invalidates necessitated by the memory transaction must have propagated through the data processing system such that any other processor cores' now stale copies of the updated cache lines have been removed (e.g., invalidated) and can no longer be read by the other processor cores. Without this requirement, a processor core could still read a stale value for an updated memory location after the memory transaction that updated the memory location committed. A processor core, therefore, needs to ensure that the memory updates associated with its own transactional stores are fully propagated through the data processing system to invalidate any stale cached copies before committing a successful memory transaction in order to maintain the semantics of memory transactions. As a consequence of the propagation of the memory updates inherent in the semantics of memory transactions, causality is trivially preserved when only memory transactions are utilized to access memory locations in a distributed shared memory system. However, when transactional and non-transactional code interact on the same shared variables, causality is not directly preserved by ensuring that the memory updates made by a memory transaction are visible simultaneously to all other processor cores.

Referring now to FIG. 6C, an illustrative multiprocessor program is depicted that includes a mixture of transactional and non-transactional accesses to a distributed shared memory system. In FIG. 6C, the branch instructions to the memory transaction fail handler are again omitted for clarity.

In the exemplary multiprocessor program, processor core 0 executes a non-transactional store instruction 660 that unconditionally writes a value of 1 to address A in the distributed shared memory system. This value propagates to processor core 1 and is read by transactional load instruction 672 within the memory transaction 670 executed by processor core 1. Processor core 1 then executes a store instruction 674 within memory transaction 670 that updates the cache line associated with address B and completes invalidating any stale cached copies of the cache line associated with address B (so that no other processor core holds a copy of the now stale cache line) and successfully commits memory transaction 670 upon execution of tend instruction 676. Processor core 2 then executes load instructions 680 and 684 to read, in order, the cache lines associated with addresses B and A, respectively, based on the ordering enforced by barrier instruction 682. If transaction 670 only ensures that its own memory updates are fully propagated through the distributed shared memory system before committing, the memory update of store instruction 660 may or may not have propagated to processor core 2. Therefore, in at least some operating scenarios, processor core 2 could read a value of 1 for the cache line associated with address B and the, now stale, initial value of 0 for the cache line associated with address A, thus violating causality. The same result would be obtained if processor core 2 utilized transactional loads to read from addresses A and B, as depicted for processor 2 in FIG. 6B.

To guarantee causality, memory transaction 670 must ensure not only that its own transactional stores are propagated throughout the entire distributed shared memory system, but also that any non-transactional store that is read by a transactional load within the transaction has also propagated throughout the distributed shared memory system. (Memory updates of transactional writes that are read by the memory transaction are guaranteed to have propagated throughout the distributed shared memory system because those memory updates could not be read by transaction 670 before they were visible to the entire distributed shared memory system). To ensure that the memory updates of non-transactional stores read by memory transaction 670 are also propagated throughout the distributed shared memory system, the processing of the tend instruction 676 of memory transaction 670 must not allow commitment of memory transaction 670 until the memory update of any non-transactional store read by memory transaction 670 is propagated throughout the distributed shared memory system.

Figure 7:
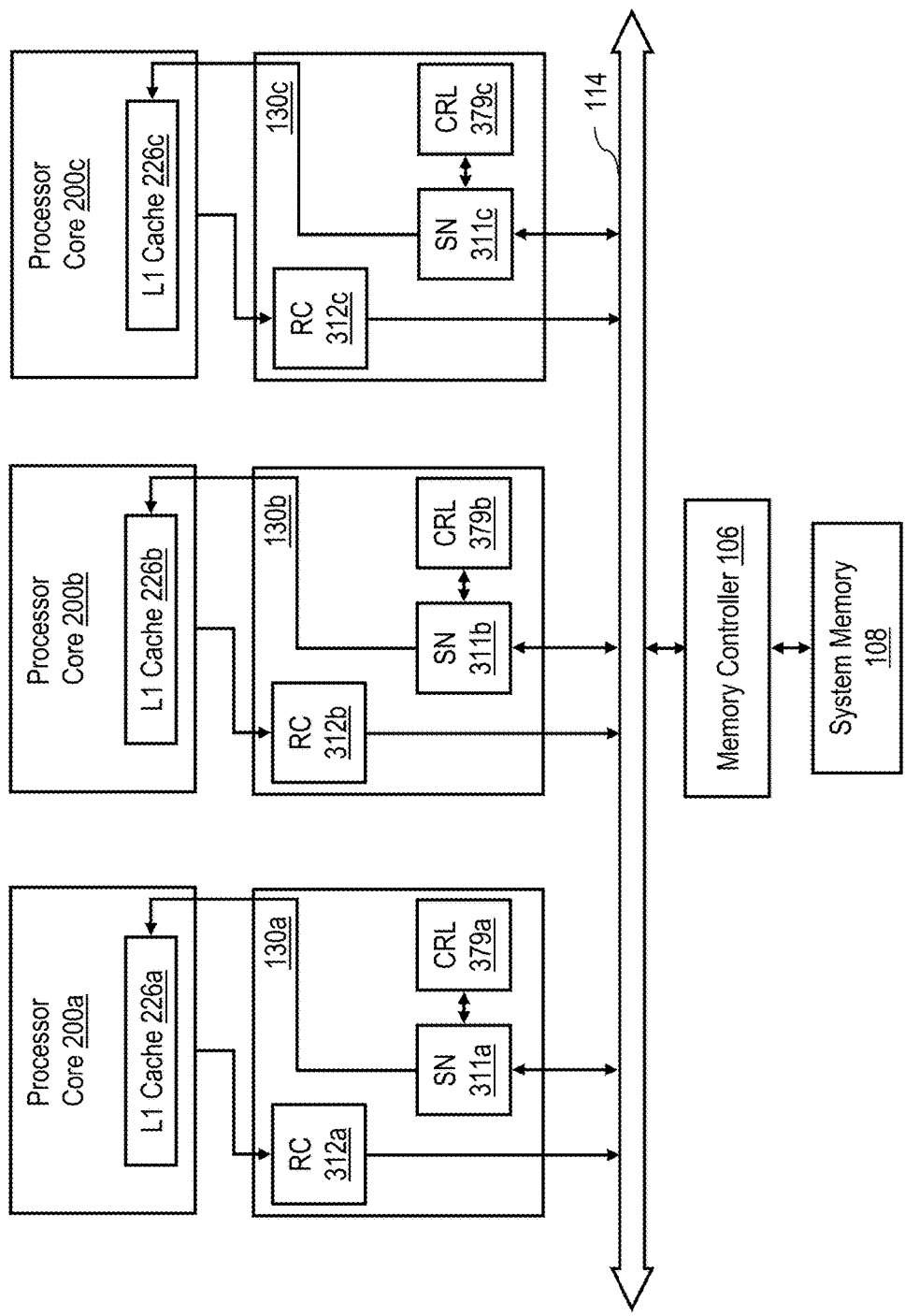
FIG. 7 illustrates a multiprocessor data processing system including at least three processor cores that execute the exemplary program of FIG. 6C.

With reference now to FIG. 7, there is illustrated a partial view of data processing system 100 of FIG. 1, which executes the multiprocessor program of FIG. 6C. In the view given in FIG. 7, processor cores 200a, 200b and 200c respectively correspond to processor cores 0, 1 and 2 of FIG. 6C. Further, an instance of causality resolution logic 379 is instantiated for and coupled to each instance of snooper 311, for example, as a component of the L2 cache 130 affiliated with each processor core 200.

Initially, processor core 200c holds a cached copy of the initial value (e.g., 0) of memory location A in its L1 cache 226c. Processor 200a begins execution of the multiprocessor program of FIG. 6C by executing store instruction 660. In response to execution of store instruction 660, processor core 200a transmits a store request to its L2 cache 130a, which allocates an RC machine 312 to service the store request. RC machine 312 broadcasts the store request onto local interconnect 114, and snoop machine 311c of the L2 cache 130c affiliated with processor core 200c registers the store request, including the processing unit that sourced the store request (i.e., the processing unit including processor core 200a). At this point, the memory update of store instruction 660 has not propagated to processor core 200c, but is instead queued for later processing, advantageously allowing processor core 200a to continue executing further instructions before the memory update of store instruction 660 is fully propagated.

Processor core 200b then executes load instruction 672 and, finding no copy of the target cache line associated with address A in its L1 cache 226b, transmits a read request to its L2 cache 130b. In response to the read request, L2 cache 130b allocates RC machine 312b to service the read request. In response to a miss of the read request in L2 cache 130b, RC machine 312b issues a read request onto local interconnect 114 to obtain the current value for address A. L2 cache 130a responds to the read request and provides the current value of address A to processor core 200b by cache-to-cache intervention. At this point a so-called "causality passing read" has occurred, that is, load instruction 672 has read the value of a store instruction that has not fully propagated through the entire distributed shared memory system. To account for this fact and to protect causality, causality resolution logic 379c in L2 cache 130c notes the successful read intervention between the vertical cache hierarchies of processor cores 200a and 200b for an address that is currently being invalidated by snoop machine 311c. In this manner causality resolution logic 379c directly tracks the causal dependency that processor 200b and its vertical cache hierarchy has on the memory update of store instruction 660 completing its propagation.

Processor 200b executes store instruction 674, which specifies an update of the value of address B to 1. In response to execution of store instruction 674, RC machine 312b issues a store request corresponding to store instruction 674 on local interconnect 114. In absence of an existing cached copy of the target cache line, memory controller 106 supplies the current value of address B from system memory 108 in response to the store request, and RC machine 312b updates L2 cache 130b accordingly. At this point processor core 1 executes tend instruction 676 to attempt to successfully commit transaction 670 and places a corresponding TEND request on local interconnect 114 to ensure that all prior memory updates by transactional stores in memory transaction 670 have been propagated throughout the distributed shared memory system and that any memory updates by non-transactional stores read by memory transaction 670 have similarly propagated throughout the distributed shared memory system. In this case, the memory update of store instruction 674 has fully propagated throughout the distributed shared memory system because no other caches held a copy of the cache line associated with address B. However, had any such copy existed and had the memory update not been fully complete, a snoop machine 311 in those caches, which noted the initial processor core 200 issuing the store, would be active and would provide a retry response to the snooped TEND request from that processor core 200 (forcing the TEND request to be reissued) until the invalidation of the cached copy of the cache line completes.

In the case at hand, the TEND request is not from the processor core 200 that initiated the store request, and therefore snoop machine 311c will not provide a retry response to the TEND request. However, causality resolution logic 379c has a causal dependency for processor 200b and its vertical cache hierarchy and issues on local interconnect 114 a retry response to the TEND request because the TEND request was issued from a processor core 200 that was the recipient of a causality passing read of the same address that snoop machine 311c is processing. In this manner, causality resolution logic 379 directly tracks which processor cores 200 have a causality dependency due to reading a memory update of a non-transactional store that was not fully completed for the processor core with which causality resolution logic 379 is associated.

It should be noted that, in general, causality resolution logic 379 must maintain a list capable of representing all the processors cores 200 in the data processing system to provide causality in cases in which the causality dependency chain passes through more than one processor core (e.g., a test where a first processor stores a location, a second processor reads that location and then stores a first flag variable, a third processor loads the first flag variable and writes a second flag in a transaction, and then a final thread reads the second flag and then the initial location). In such an implementation, a TEND request issued from any processor core with a causal dependency on the target address being invalidated by the snoop machine 311 associated with the instance of causality resolution logic 379 is retried. In a large SMP, however, such an embodiment can be prohibitive in cost and many implementations of causality resolution logic 379 only precisely track causal dependency chains of a certain fixed depth (e.g., two or three processors) and in the presence of longer dependency chains resort to pessimistically retrying all TEND requests until the cache line invalidations necessitated by the store instruction have completed processing.

To summarize, causality resolution logic is utilized to detect the occurrence of causal dependency chains, to a depth determined by the embodiment, on a pending store that has not completed processing throughout the entire distributed shared memory system. These causal dependencies are utilized to stall the completion of TEND requests from those processor cores with a causal dependency on the incomplete (pending) stores. In this manner, the memory transaction cannot complete (and therefore make its own stores visible), until the stores the memory transaction has read (i.e., those in the causal dependency chain of the memory transaction) have first completed throughout the distributed shared memory system. Only after these stores in the memory transaction's causal dependency chain (and the transactional stores of the memory transaction itself, though this is guaranteed by snooper 311 instead of causality resolution logic 379) have completed, may the TEND request complete, leading to the memory transaction successfully committing if no conflicts have occurred during its execution.

In other embodiments, additional causality resolution logic may be required to ensure the causality of memory operations. For example, in an implementation that contains a write-through L1 cache shared by a multithreaded processor core followed by a shared L2 store queue, it is possible for different threads (i.e., logically different processor cores from the point of view of software) to read stored values from the L1 cache before these stores have even propagated to the L2 cache, much less to the entire distributed shared memory system. In such an implementation, the tend instruction must act as a barrier for transactional stores in the given thread. This behavior ensures that the transactional stores are propagated to the system interconnect and the necessary snoop machines 311 so that the tend instruction can ensure, when trying to complete the memory transaction, that all of the cache line invalidations required by the memory transaction's stores have fully propagated. In addition, the tend instruction must act as a barrier for non-transactional stores that have been (or may have been) read by transactional loads within the transaction. In the simplest (and most common embodiment), all non-transactional stores within the shared store queue are treated as if they have come from a single thread for purposes of retrying the TEND request.

In this manner, all non-transactional stores from which any transaction has (or may have) read that have not been fully propagated are broadcast to snoop machines 311 as necessary before a TEND request for any transaction from that multithreaded processor core is presented on local interconnect 114. In such an embodiment, snoop machines 311 treat all stores coming from a given multithreaded processor core in a unified manner and will retry any TEND request, as necessary, from that given multithreaded processor core regardless of thread. In this embodiment, causality resolution logic 379 is not involved in monitoring these intra-core dependencies, but instead is utilized solely to manage causality dependencies between multithreaded processor cores.

The exact placement and details of the necessary causality resolution logic will vary with the particulars of given embodiment and will be apparent to those skilled in the art given the teachings herein. In general, at any point where a load may return the value of a store that has not fully propagated throughout the entire distributed shared memory system, if causality is to be preserved a mechanism must be provided to ensure that any store with a causal dependency to a different processor core is noted and that causal dependency delays the processing of a tend instruction (or other semantic) ending a memory transaction until such time as the stores in the causal dependency chain of the memory transaction have completed propagating.

Figure 8:
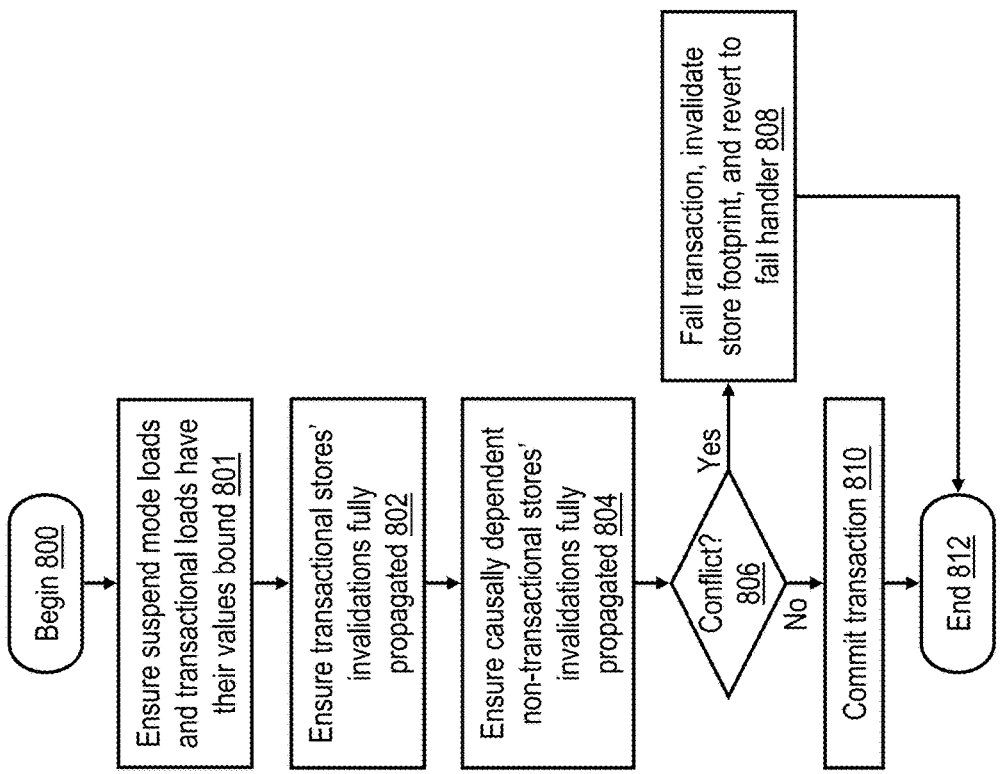
FIG. 8 is a high level logical flowchart of an exemplary method by which a multiprocessor data processing system ensures causality in execution of a program including both transactional and non-transactional memory accesses.

Referring now to FIG. 8, there is depicted a high level logical flowchart of the processing of a tend instruction terminating a memory transaction in accordance with one embodiment. The process begins at block 800, for example, in response to initiation of execution of a tend instruction within the LSU 202 of a processor core 200. The process of FIG. 8 proceeds from block 800 to block 801, which depicts LSU 202 ensuring that all prior suspend mode load instructions and all prior transactional load instructions have their values bound. This check ensures the transactional load instructions are present in the memory transaction's footprint and that the suspend mode load instructions have obtained their values. The process proceeds from block 801 to block 802, which depicts ensuring that the cache line invalidations necessitated by transactional stores within the memory transaction have been fully propagated throughout the distributed shared memory system. In the embodiment described above, verification of propagation of the cache line invalidations necessitated by transactional stores is accomplished by one or more snoop machines 311 providing a retry response to any applicable TEND request on local interconnect 114 until the previous transactional stores have invalidated all cached copies of the memory location(s) targeted by the memory updates. The process then proceeds to step 804, which illustrates ensuring that the cache line invalidations necessitated by causally dependent non-transactional stores have completely propagated throughout the distributed shared memory system. In the embodiment described above, verification of propagation of the cache line invalidations necessitated by non-transactional stores is accomplished by one or more instances of causality resolution logic 379 providing a retry response to any applicable TEND request on local interconnect 114 until the previous memory updates of causally dependent non-transactional stores have invalidated all cached copies of the memory location(s) targeted by the memory updates.

At block 806, transactional control logic 382 determines whether or not a conflict has occurred for the memory transaction. In response to transactional control logic 382 determining that a conflict has occurred, the process proceeds to block 808, which depicts transactional control logic 382 invalidating the tentative store footprint of the memory transaction (e.g., as recorded in L2 cache 130) and indicating via pass/fail indication 384 that the memory transaction has failed. As further illustrated at block 808, in response to pass/fail indication 384 processor core 200 updates its condition code register and transfers control to the fail handling branch instruction within the memory transaction (block 808). The process then terminates at step 812.

Returning to block 806, in response to transactional control logic 382 determining that no conflict has occurred during execution of the memory transaction, the process proceeds to step 810, which depicts TM control logic 382 committing the transaction, inter alia, by causing the transaction footprint to be committed to the distributed shared memory system (e.g., by updating one or more coherence states in the directory 308 of L2 cache 130 to indicate the transaction footprint is valid and available for access by all threads) and indicating to processor core 200 via pass/fail indication 384 that the memory transaction passed. The process then terminates at block 812.

Memory transactions, as described above, enable a programmer to enforce execution of groups of load and/or store instructions by a data processing system in an atomic fashion and to fail and repeat the memory transactions as necessary to preserve the appearance of atomicity of the storage accesses of the memory transactions in the presence of conflicts with other storage accesses. While memory transactions provide a valuable and needed capability, there is also a need to be able to speculatively execute a block of instructions, particularly including store instructions, and then to be able to discard the results of that execution under software control without regard to the existence of conflicting accesses. For example, some programming models require that the execution of certain code sequences do not cause a fault. To avoid such faults, an additional code sequence is typically required to validate that the inputs to the code sequence will not produce a fault before the sequence is executed. This pre-validation can incur significant additional overhead. However, with a "rewind only" transaction (ROT) as described herein, the code sequence may be speculatively executed without the additional overhead of validation and may then be rewound if a fault occurs.

Discarding or "rewinding" the storage-modifying effects of a store instruction has traditionally not been supported in prior processors, and therefore the amount of speculation permitted for a store instruction (and for instructions dependent on that store instruction) was severely limited. As described herein, the mechanisms supporting transactional memory may be adapted, reused and extended to efficiently support a discardable speculative execution mechanism for blocks of instructions, specifically those including store instructions. Without the enhancements described herein, a full memory transaction would be required to rewind store instructions, at additional cost as described below.

To support rewinding the storage-modifying effects of store instructions, a distinct type of memory transaction referred to herein as a "rewind only" transaction (ROT) is introduced. Unlike a traditional memory transaction, a ROT, by definition, does not require any conflict detection or atomicity guarantees, but rather only provides a semantic to enforce the discarding of the execution results of a group of one or more speculatively executed instructions that may include one or more store instructions. Furthermore, the commitment of a ROT does not depend upon or require the propagation of the invalidations of causally dependent non-transactional stores through the distributed shared memory system, as described above with reference to block 804 of FIG. 8.

While conflict detection is not required for the semantic definition of a ROT, a typical implementation will provide conflict tracking for store instructions within the ROT, if only to avoid additional unnecessary complexity in the design of the processor core and cache hierarchy at little additional benefit. So while conflict tracking is not required for a ROT as a matter of definition (because atomicity is not preserved by a ROT), as a matter of implementation, hardware supporting execution of ROTs will typically provide conflict tracking for the store footprint of a ROT for simplicity.

The utility of retaining store footprint conflict tracking for ROTs can be seen in the management of conflicts between different threads on a multi-threaded processor core sharing a common write-through L1 cache. In such a multi-threaded processor core, if multiple threads were concurrently executing ROTs including store instructions targeting a given cache line, the L1 cache would have to be able to maintain a different image of the given cache line for each thread (i.e., the L1 cache would have to be able to hold multiple concurrently active images of any given cache line). Furthermore, when each ROT committed, the L1 cache would have to be able to merge the updates made to the cache line by the thread committing the ROT into the remaining concurrent copy or copies of the cache line—an operation that is exceptionally complex. In general, it is far more efficient and less costly to employ the existing conflict tracking mechanisms for the store footprint of a ROT as if it were a non-ROT memory transaction.

Typically, load instructions will significantly outnumber store instructions in a memory transaction. For TM control logic 380 of a given capacity, a significantly larger transaction can therefore be accommodated as a ROT rather than a non-ROT memory transaction (which, in the absence of ROTs would have to be employed to rewind speculatively executed store instructions). Furthermore, a ROT can successfully complete in the presence of false sharing conflicts (i.e., a conflict that occurs, for example, when a store instruction from another thread writes within a cache line in the footprint of a memory transaction, but does not actually alter the data being manipulated by the memory transaction). Because conflicts are tracked on a per cache-line basis and not on a per-location basis, such false sharing conflicts cause the failure of memory transactions that are not strictly required by the definition of a memory transaction, but must occur due to the limitations of the conflict tracking implementation. ROTs, however, are more resilient in the presence of such false sharing conflicts than the non-ROT memory transactions that would have to be used in the absence of support for ROTs.

Figure 9:
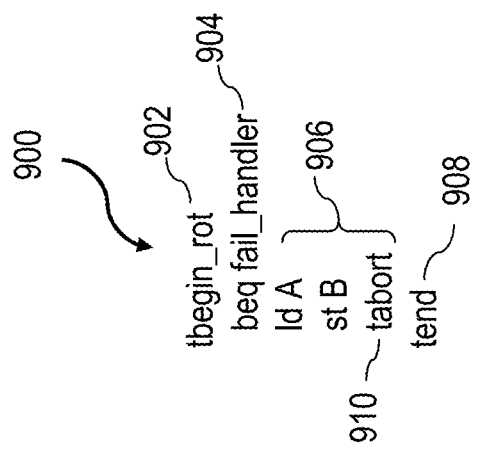
FIG. 9 is an illustrative example of a rewind-only memory in accordance with one embodiment.

With reference now to FIG. 9, an illustrative example of a representative ROT 900 is illustrated. ROT 900 may form, for example, a portion of a multiprocessor program.

ROT 900 begins with a unique instruction, tbegin_rot 902, which identifies the beginning of a ROT. Similar to a normal (i.e., non-ROT) memory transaction 400 of FIG. 4, the instruction immediately following tbegin_rot instruction 902 is a branch instruction 904 that redirects execution to a failure handling routine in response to the ROT 900 either failing or (as explained below) aborting under software control. Branch instruction 904 is followed by a transaction body 906, which may contain transactional memory access (e.g., load and/or store) or other instructions, and possibly one or more tabort instruction(s) 910. If present, tabort instruction 910 directs execution of ROT 900 to be aborted and execution results of ROT 900 to be discarded. Although not illustrated in FIG. 9, ROT 900 may further optionally include bypass instructions that determine if ROT 900 should be aborted (e.g., based on a variable value read from the distributed shared memory system by a transactional load of the ROT or the availability of a system resource) and that, responsive to the determination, either cause tabort instruction 910 to be executed or cause execution to branch around tabort instruction 910 to one or more transactional instruction including tend instruction 908, which, when executed, causes ROT 900 to be committed (and, in particular, makes the storage-modifying effects of the store instructions within transaction body 906 non-speculative).

If a tabort instruction 910 within a ROT 900 is executed, the execution results of ROT 900 are discarded, a condition code register is updated to indicate that a tabort instruction 910 caused the ROT to fail, and control passes to branch instruction 904, which is taken based on the value present in the condition code register. Execution of a tabort instruction 910 is the primary way in which the speculative execution results of a ROT 900 are discarded and control is passed to the fail handler via branch instruction 904. Among other reasons, a ROT 900 (or non-ROT memory transaction) may also fail and pass control to the fail handler via branch instruction 904 (or branch instruction 404) due to a capacity overflow (overflowing the capacity of TM logic 380) or due to execution of an instruction (e.g., a cache-inhibited load or store instruction) that can have untracked side effects and therefore is inherently unable to be re-executed and consequently cannot legally appear in a ROT or memory transaction (which may have to be executed several times to successfully commit).

Figure 10:
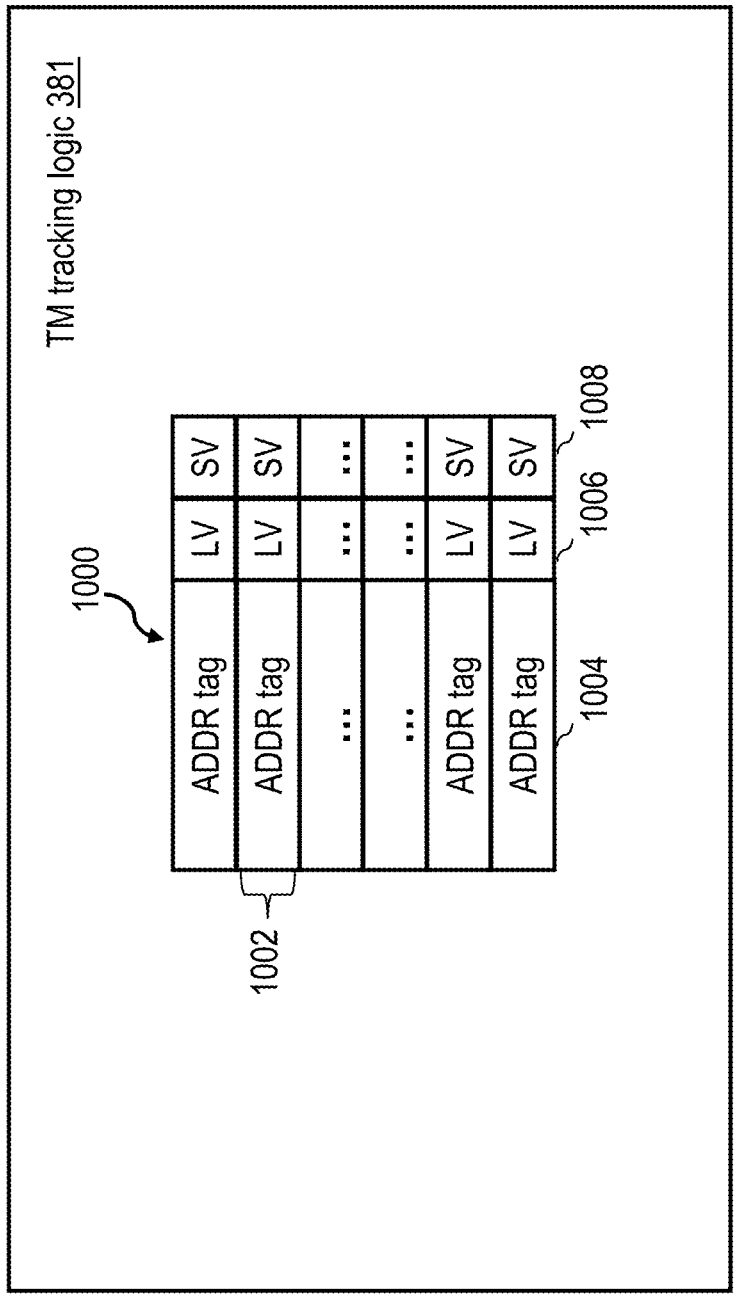
FIG. 10 is more detailed view of transactional memory tracking logic in accordance with one embodiment.

Referring now to FIG. 10, there is illustrated a more detailed view of TM tracking logic 381 in accordance with one embodiment. As depicted, TM tracking logic 381 includes a TM directory 1000, which contains a number of entries 1002 for tracking the cache lines within the load and store footprints of ROTs and/or non-ROT memory transactions. In the depicted embodiment, each entry 1002 within TM directory 1000 includes three fields: address tag field 1004, load valid (LV) field 1006, and store valid (SV) field 1008. Address tag field 1004 indicates the real memory address of a cache line that is in the footprint of the ROT or non-ROT memory transaction. SV field 1006 and LV field 1008 respectively indicate whether the cache line is part of the store footprint or load footprint of the memory transaction. In at least one embodiment, LV field 1006 and SV field 1008 are mutually exclusive, meaning that, for a given entry 1002, one or neither of LV field 1006 and SV field 1008 may be set concurrently but not both. When both of fields 1006 and 1008 are reset, the entry 1002 is invalid and no cache line is then being tracked by that entry 1002.

For a non-ROT memory transaction, when a transactional load is presented to TM logic 380 and there is no entry in TM directory 1000 for the target cache line of the transactional load, a new entry 1002 is allocated (possibly evicting an existing entry 1002), the address tag field 1004 of the new entry is updated with the address tag of the target cache line, and the LV field 1006 is set. If, on the other hand, an existing entry 1002 is already tracking the target cache line (and therefore either LV field 1006 or SV field 1008 is already set), no update to the existing entry 1002 is made because the target cache line of the transactional load is already being tracked.

As with a transactional load, if a transactional store of a non-ROT memory transaction is presented to TM logic 380 and there is no entry in TM directory 1000 for the target cache line of the transactional store, a new entry 1002 is allocated (possibly evicting an existing entry 1002), the address tag field 1004 of the new entry is updated with the address tag of the target cache line, and the SV field 1008 is set. If, on the other hand, an existing entry 1002 is already tracking the target cache line and LV field 1006 is set for that entry 1002, then LV field 1006 is reset, and SV field 1008 is set to indicate that this cache line is now part of the store footprint for the memory transaction. If SV field 1008 is already set for the existing entry 1002, no update to entry 1002 is performed.

In response to a ROT or non-ROT memory transaction committing or failing, TM tracking logic 381 clears the entries 1002 in TM directory 1000.

For a ROT, TM tracking logic 381 updates TM directory 1000 as described above for transactional stores of non-ROT memory transactions. However, for loads within the ROT, TM tracking logic 381 does not update TM directory 1000 because the load footprint is not tracked for conflicts in a ROT. This behavior can be implemented in at least two ways. In a first implementation, all non-transactional load and store operations transmitted from a processor core 200 to its L2 cache 130 are identified as either being a non-transactional load or store, a non-ROT transactional load or store, or as a ROT transactional load or store. In this case, TM tracking logic 381 ignores ROT transactional loads for purposes of updating TM directory 1000. In another implementation, all non-transactional loads and stores and ROT loads are identified as being non-transactional and are accordingly ignored by TM tracking logic 381 for purposes of updating TM directory 1000. ROT transactional stores and non-ROT transactional loads and stores are identified as being transactional, and TM tracking logic 381 accordingly updates TM directory 1000 as described above for non-ROT transactional loads and stores. In either implementation, TM tracking logic 381 preferably does not update TM directory 1000 for ROT transactional loads.

Figure 11:
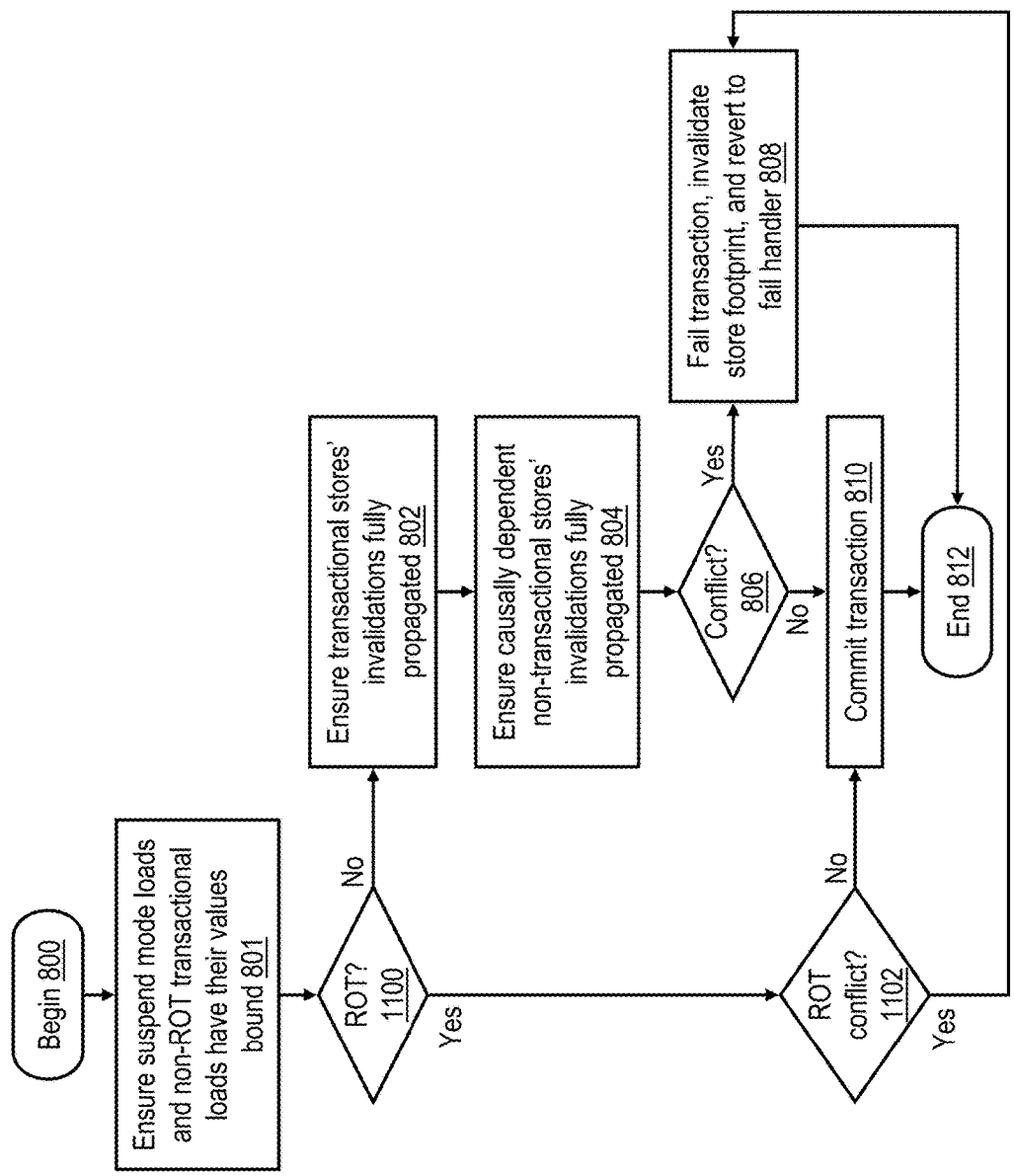
FIG. 11 is a high level logical flowchart of an exemplary method by which a rewind-only transaction is processed in accordance with one embodiment.

With reference now to FIG. 11, there is illustrated a high level logical flowchart of a method of processing of a tend instruction terminating a non-ROT memory transaction or a ROT in accordance with one embodiment. For ease of understanding, like reference numerals are utilized to denote steps corresponding to those depicted in FIG. 8.

The process of FIG. 11 begins at block 800, for example, in response to initiation of execution of a tend instruction within the LSU 202 of a processor core 200. LSU 202 then ensures at block 801 that all prior suspend mode load instructions and all prior non-ROT transactional load instructions have their values bound. This check ensures the non-ROT transactional load instructions are present in the memory transaction's footprint and that the suspend mode load instructions have obtained their values. LSU 202 then determines at block 1100 whether or not the memory transaction terminated by the tend is a ROT or non-ROT memory transaction. In response to a determination that the memory transaction is a non-ROT memory transaction, the process continues to block 802 and subsequent blocks, which have been described.

Returning to block 1100, in response to a determination that the tend instruction terminates a ROT, blocks 802, 804 and 806 are bypassed as unnecessary for a ROT, and control passes to block 1102. Block 1102 depicts LSU 202 querying TM logic 380 whether a conflict for the ROT's store footprint was detected by TM tracking logic 381 (as opposed to a conflict on either the load or store footprint for a non-ROT memory transaction). In response to TM logic 380 indicating a conflict has been detected for the store footprint of the ROT, the process proceeds to block 808, which depicts failing the ROT and invalidating its store footprint as described above. In response to TM logic 380 indicating at block 1102 that no conflict for the ROT has been detected, the process proceeds to block 810, which illustrates commitment of the ROT to the distributed shared memory system as described above. It should again be noted that commitment of the ROT does not require observance of causality, as described above with reference to block 804. Following either block 808 or block 810, the process concludes at block 812.

Commercially available processors commonly allow out-of-order execution of the instructions within a thread in order to achieve high instruction throughput. In such processors, numerous instructions within a same thread can be at various stages of execution at any given time, and the processor can generally execute the instructions in any order as long as dependencies between instructions (and barrier instructions) are observed. Commercially available processors also commonly support speculative instruction execution, that is, the execution of instructions for which it is not certain that the execution results will be committed to the architected state of the processor. It should be appreciated that out of the various types of memory access instructions, load instructions can be executed speculatively, but store instructions (except for execution within an enclosing memory transaction) generally cannot be executed speculatively because store instructions necessarily modify the architected state of the processor. The definition of which load instructions are "speculative" can also vary between implementations. For example, in some implementations, a load instruction can be considered speculative if it follows in program order a branch instruction that has not yet been resolved as taken or not-taken. In other implementations, a more expansive definition can be employed. For example, any load instruction can be deemed speculative as long as it is not the "next to complete" (NTC) instruction, where the NTC instruction is defined as the instruction for which all preceding instructions in program order have been architecturally committed. As employed herein, however, the term "speculative" is defined to exclude those instructions whose execution results may or may not be committed to the architected state of the processor only by virtue of inclusion of those instructions within a memory transaction. (Transactional instructions may, however, still be speculative, as made clear below.)

In the absence of memory transactions, speculative load instructions can be discarded and re-executed one or many times without any negative architectural side effects and with a relatively small performance impact. However, if speculative load instructions are executed in the presence of memory transactions, speculative load requests generated by the execution of speculative load instructions of a first thread can hit the footprint of a memory transaction of a second thread tracked by TM tracking logic 381 and cause such memory transactions to fail. Such collisions can occur both in cases in which the first and second threads are executed on different processor cores 200 and in cases in which the first and second threads are simultaneously executed on a common processor core 200 and share a common vertical cache hierarchy.

The present disclosure recognizes that any memory transaction failures caused by speculative load instructions that are ultimately discarded are unnecessary from an architectural perspective and amplify the negative performance impact of unsuccessful speculative execution. Data prefetch requests, which are inherently speculative, can also have the undesirable effect of unnecessarily causing memory transactions to fail. To reduce unnecessary failures of memory transactions, TM logic, such as TM logic 380, preferably responds to speculative memory access requests of one thread (e.g., speculative load requests and data prefetch requests) that hit the store footprint of a memory transaction of another thread with a response and/or special data packet that causes the speculative memory access request to fail and be re-executed, if necessary, rather than the memory transaction failing.

Referring now to FIGS. 12A-12B, there is depicted a high level logical flowchart of an exemplary method by which collisions between memory access requests and memory transactions are detected and resolved in accordance with one embodiment. The illustrated method can be performed, for example, by TM logic 380 of FIG. 3.

The process begins at block 1200, for example, in response to receipt by TM logic 380 of a memory access request, which can be received from the associated processor core 200 or received from another processor core 200 via local interconnect 114. In response to receipt of the memory access request, TM logic 380 determines at block 1202 whether or not the memory access request is speculative. As noted above, store requests are non-speculative, but all data prefetch requests and at least some load requests, whether transactional or non-transactional, are speculative. In at least one embodiment, load requests defined to be speculative in the relevant embodiment of data processing system 100 are identified as such by a ttype or label associated with the load requests by the issuing processor core 200.

In response to a determination at block 1202 that the memory access request received by TM logic 380 is not a speculative request (i.e., is a store request or a non-speculative load request), the process passes through page connector A to block 1230 of FIG. 12B, which is described below. If, on the other hand, TM logic 380 determines at block 1202 that the memory access request is a speculative request (i.e., a load request or data prefetch request), TM logic 380 further determines at block 1204 whether or not the speculative memory access request is transactional, that is, generated by execution of a load instruction within a memory transaction. In at least one embodiment, TM logic 380 determines whether or not the memory access request is transactional, for example, by a ttype or label associated with the memory access request. In response to a determination at block 1204 that the memory access request is transactional and therefore a transactional load request (and not a data prefetch request), the process proceeds to block 1212, which is described below. In response to determination at block 1204 that the speculative memory access request is not transactional and is therefore a non-transactional load request or data prefetch request, the process passes to block 1206.

As indicated at block 1206, if TM logic 380 is not presently configured (e.g., in hardware or by software) to filter speculative non-transactional load and data prefetch requests, TM logic 380 handles the speculative non-transactional load or data prefetch request as depicted at block 1208 and following blocks. If, on the other hand, TM logic 380 is presently configured to filter speculative non-transactional load and data prefetch requests, TM logic 380 handles the speculative non-transactional load or data prefetch request as depicted at block 1214 and following blocks.

Referring now to block 1208, TM logic 380 determines whether or not the target address of the speculative non-transactional load or data prefetch request hits the store footprint of a memory transaction of another thread that is being tracked by TM tracking logic 381. If not, TM logic 380 allows the speculative non-transactional load or data prefetch request to be serviced in accordance with the coherence protocol implemented by data processing system 100 (block 1216). Following block 1216, the process of FIG. 12A ends at block 1220. If, however, TM logic 380 determines at block 1208 that the target address of the speculative non-transactional load or data prefetch request hits the store footprint of a memory transaction of another thread that is being tracked by TM tracking logic 381, TM logic 380 fails the memory transaction as shown at block 1210 by returning to the associated processor core 200 a fail indication 384 at the conclusion of the memory transaction, and optionally, an earlier TM killed indication 385. Thereafter, the process passes to blocks 1216 and 1220, which have been described.

Referring now to block 1212, if TM logic 380 is not presently configured (e.g., in hardware or by software) to filter speculative transactional memory access requests (i.e., speculative transactional load requests), TM logic 380 handles the speculative transactional load request as depicted at block 1208 and following blocks, which have been described. If, on the other hand, TM logic 380 is presently configured to filter speculative transactional load requests, TM logic 380 handles the speculative non-transactional load request as depicted at block 1214 and following blocks.

At block 1214, TM logic 380 determines whether or not the target address of the speculative transactional load request hits the store footprint of a memory transaction of another thread that is being tracked by TM tracking logic 381. If not, TM logic 380 allows the speculative transactional load request to be serviced in accordance with the coherence protocol implemented by data processing system 100 (block 1216). Thereafter, the process of FIG. 12A ends at block 1220. If, however, TM logic 380 determines at block 1214 that the target address of the speculative transactional load request hits the store footprint of a memory transaction of another thread that is being tracked by TM tracking logic 381, TM logic 380 causes L2 cache 230 to not service the speculative transactional memory access request and to provide a rejection indication to the requesting processor core 200 as shown at block 1218. In various embodiments, a rejection indication provided to the associated processor core 200 can include, for example, a retry signal and/or an indicator provided with the data. A rejection indication provided in response to a speculative transactional load request snooped on local interconnect 114 can include, for example, a coherence response message (e.g., a partial response representing the individual coherence response of L2 cache 230 to the snooped load request) and/or an indicator provided with the data. Following block 1218, the process of FIG. 12A ends at block 1220.

It should be noted that in the process of FIG. 12A no check is made whether the target address of the speculative load or data prefetch request hits the load footprint of a memory transaction because an address collision between a speculative load or data prefetch request and the load footprint has no effect on the successful completion of the memory transaction.

Referring now to FIG. 12B, if the memory access request received by TM logic 380 is non-speculative (i.e., a non-speculative load request or a store request), TM logic 380 determines at block 1230 whether or not the non-speculative load or store request is transactional. If not, the process proceeds to block 1232, which illustrates TM logic 380 determining (e.g., by reference to the ttype) whether or not the non-speculative non-transactional memory access request is a load request. In response to a determination at block 1232 that the non-speculative, non-transactional memory access request is a load request, TM logic 380 determines whether or not the target address of the load request hits the store footprint of the memory transaction of another thread (block 1234). If not, TM logic 380 allows the non-speculative, non-transactional load request to be serviced by L2 cache 230 in accordance with the coherence protocol implemented by data processing system 100 (block 1238). Thereafter, the method of FIG. 12B ends at block 1280. If, however, TM logic 380 determines at block 1234 that the target address of the non-speculative, non-transactional load request hits the store footprint of the memory transaction of another thread, TM logic 380 fails the memory transaction as shown at block 1236 by returning a fail indication 384 to the associated processor core 200 at the conclusion of the memory transaction, and optionally, an earlier TM killed indication 385. Thereafter, the process passes to blocks 1238 and 1280, which have been described.

Referring again to block 1232, in response to a determination that the non-speculative non-transactional memory access request is a store request, TM logic 380 determines whether or not the target address of the store request hits the load or store footprint of the memory transaction of another thread (block 1240). If not, TM logic 380 allows the processing of any existing transaction to continue as indicated by the process passing to block 1280 and terminating. If, however, TM logic 380 determines at block 1240 that the target address of the store request hits the load or store footprint of the memory transaction of another thread, TM logic 380 fails the existing memory transaction as shown at block 1242 by returning to the associated processor core 200 a fail indication 384 at the conclusion of the memory transaction, and optionally, an earlier TM killed indication 385. Thereafter, the process of FIG. 12B ends at block 1280.

Referring again to block 1230, in response to TM logic 380 determining that the non-speculative memory access request is transactional, the process proceeds to block 1250, which illustrates TM logic 380 determining (e.g., by reference to the ttype) whether or not the non-speculative transactional memory access request is a transactional load request. In response to a determination at block 1250 that the non-speculative transactional memory access request is a transactional load request, TM logic 380 determines whether or not the target address of the load request hits the store footprint of the memory transaction of another thread (block 1270). If not, TM logic 380 allows the non-speculative transactional load request to be serviced in accordance with the coherence protocol implemented by data processing system 100 (block 1274). Thereafter, the method of FIG. 12B ends at block 1280. If TM logic 380 determines at block 1270 that the target address of the load request hits the store footprint of the memory transaction of another thread, TM logic 380 also allows the non-speculative transactional load request to be serviced in accordance with the coherence protocol implemented by data processing system 100 (block 1272). However, TM logic 380 also fails the existing memory transaction as shown at block 1260 by returning to the associated processor core 200 a fail indication 384 at the conclusion of the memory transaction, and optionally, an earlier TM killed indication 385. Thereafter, the process of FIG. 12B ends at block 1280.

Referring again to block 1250, if the non-speculative transactional memory access request is a transactional store request, TM logic 380 further determines whether or not the target address of the transactional store request hits the load or store footprint of the memory transaction of another thread, as shown at blocks 1252 and 1254, respectively. In response to a determination that the target address of the transactional store request does not hit the load or store footprint of an existing memory transaction of another thread, TM logic 380 allows the existing transaction, if any, to proceed as indicated by the process passing from blocks 1252-1254 to block 1280 and terminating. If, however, TM logic 380 determines at blocks 1252 and 1254 that the target address of the store request hits the load or store footprint of the memory transaction of another thread, TM logic 380 fails either a first memory transaction including the transactional store instruction that generated the transactional store request (i.e., the "requesting transaction") or a second memory transaction to which the conflicting transaction footprint belongs (i.e., the "existing transaction"). According to a preferred embodiment of the conflict resolution policy which favors stores over loads, if TM logic 380 determines at block 1254 that the target address of the transactional store request of a first (or "requesting") transaction hits the store footprint of a second (or "existing") memory transaction, TM logic 380 fails the first (or "requesting") transaction as shown at block 1256. On the other hand, if TM logic 380 determines at block 1252 that the target address of the transactional store request of a first (or "requesting") transaction hits the load footprint of a second (or "existing") memory transaction, TM logic 380 preferably instead fails the second (or "existing") transaction, as shown at block 1260. As noted above, TM logic 380 fails a transaction at block 1256 or bock 1260 by returning to the associated processor core 200 a fail indication 384 at the conclusion of the transaction, and optionally, an earlier TM killed indication 385. Following either block 1256 or block 1260, the process of FIG. 12B ends at block 1280.

Figure 13:
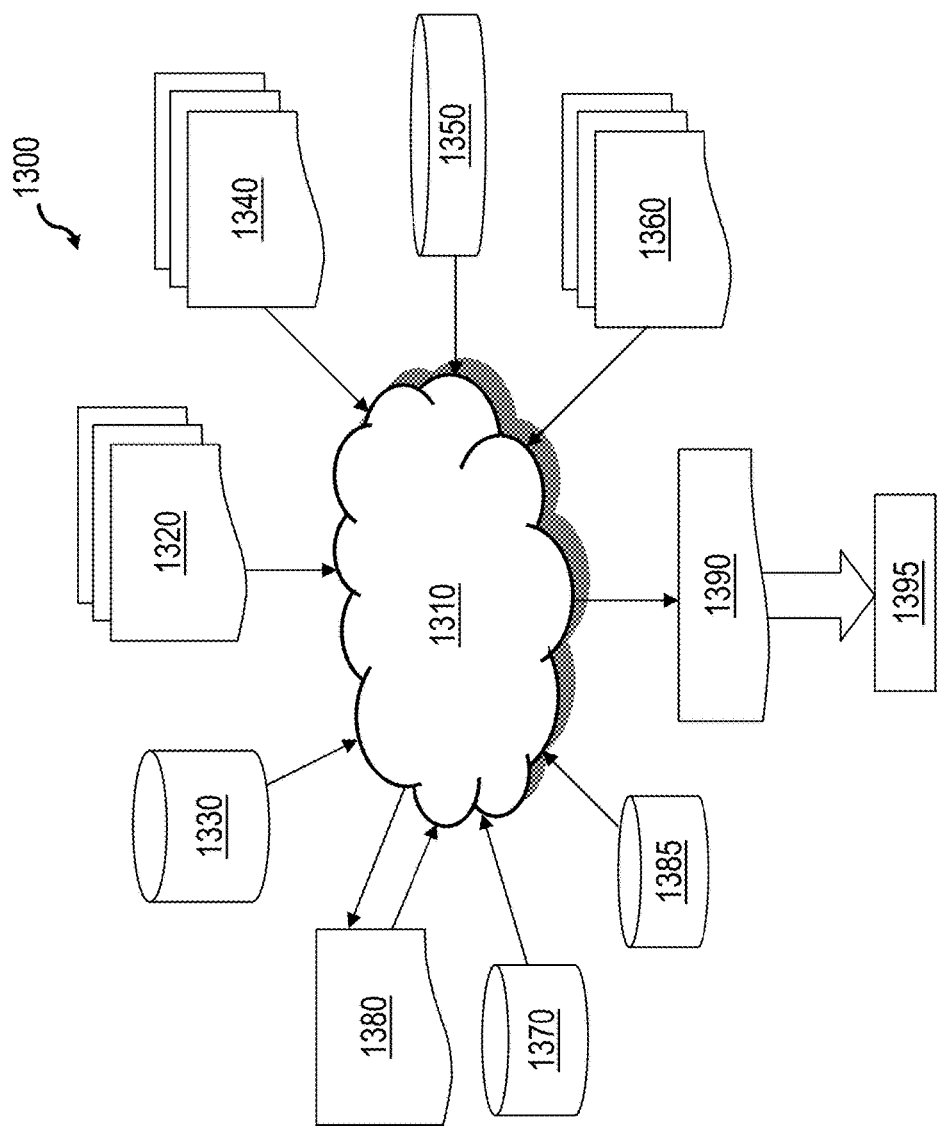
FIG. 13 is a data flow diagram illustrating a design process.

With reference now to FIG. 13, there is depicted a block diagram of an exemplary design flow 1300 used for example, in semiconductor IC logic design, simulation, test, layout, and manufacture. Design flow 1300 includes processes, machines and/or mechanisms for processing design structures or devices to generate logically or otherwise functionally equivalent representations of the design structures and/or devices described above and shown in FIGS. 1-3, 7, and 10. The design structures processed and/or generated by design flow 1300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1300 may vary depending on the type of representation being designed. For example, a design flow 1300 for building an application specific IC (ASIC) may differ from a design flow 1300 for designing a standard component or from a design flow 1300 for instantiating the design into a programmable array, for example a programmable gate array (PGA) or a field programmable gate array (FPGA) offered by Altera® Inc. or Xilinx® Inc.

FIG. 13 illustrates multiple such design structures including an input design structure 1020 that is preferably processed by a design process 1310. Design structure 1320 may be a logical simulation design structure generated and processed by design process 1310 to produce a logically equivalent functional representation of a hardware device. Design structure 1320 may also or alternatively comprise data and/or program instructions that when processed by design process 1310, generate a functional representation of the physical structure of a hardware device. Whether representing functional and/or structural design features, design structure 1320 may be generated using electronic computer-aided design (ECAD) such as implemented by a core developer/designer. When encoded on a machine-readable data transmission, gate array, or storage medium, design structure 1320 may be accessed and processed by one or more hardware and/or software modules within design process 1310 to simulate or otherwise functionally represent an electronic component, circuit, electronic or logic module, apparatus, device, or system such as those shown in FIGS. 1-3, 7, and 10. As such, design structure 1320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1310 preferably employs and incorporates hardware and/or software modules for synthesizing, translating, or otherwise processing a design/simulation functional equivalent of the components, circuits, devices, or logic structures shown in FIGS. 1-3, 7, and 10 to generate a netlist 1380 which may contain design structures such as design structure 1320. Netlist 1380 may comprise, for example, compiled or otherwise processed data structures representing a list of wires, discrete components, logic gates, control circuits, I/O devices, models, etc. that describes the connections to other elements and circuits in an integrated circuit design. Netlist 1380 may be synthesized using an iterative process in which netlist 1380 is resynthesized one or more times depending on design specifications and parameters for the device. As with other design structure types described herein, netlist 1380 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1310 may include hardware and software modules for processing a variety of input data structure types including netlist 1380. Such data structure types may reside, for example, within library elements 1330 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310 without deviating from the scope and spirit of the invention. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures along with any additional mechanical design or data (if applicable), to generate a second design structure 1390. Design structure 1390 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1320, design structure 1390 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3, 7, and 10. In one embodiment, design structure 1390 may comprise a compiled, executable HDL simulation model that functionally simulates the devices shown in FIGS. 1-3, 7, and 10.

Design structure 1390 may also employ a data format used for the exchange of layout data of integrated circuits and/or symbolic data format (e.g., information stored in a GDSII (GDS2), GL1, OASIS, map files, or any other suitable format for storing such design data structures). Design structure 1390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3, 7, and 10. Design structure 1390 may then proceed to a stage 1395 where, for example, design structure 1390: proceeds to tape-out, is released to manufacturing, is released to a mask house, is sent to another design house, is sent back to the customer, etc.

As has been described, in at least one embodiment, a cache memory of a data processing system receives a speculative memory access request including a target address of data speculatively requested for a processor core. In response to receipt of the speculative memory access request, transactional memory logic determines whether or not the target address of the speculative memory access request hits a store footprint of a memory transaction. In response to determining that the target address of the speculative memory access request hits a store footprint of a memory transaction, the transactional memory logic causes the cache memory to reject servicing the speculative memory access request.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system, the method comprising:

at a cache memory of a data processing system, receiving a speculative memory access request, the speculative memory access request including a target address of data speculatively requested for a processor core;

in response to receipt of the speculative memory access request, transactional memory logic determining whether the target address of the speculative memory access request matches an address in a set of addresses forming a store footprint of a memory transaction;

in response to determining that the target address of the speculative memory access request matches an address in the set of addresses forming the store footprint of the memory transaction, the transactional memory logic causing the cache memory to reject servicing the speculative memory access request; and the transactional memory logic maintaining a directory that records the store footprint of the memory transaction, wherein the store footprint includes the set of addresses to which one or more store accesses have been made in response to execution of one or more transactional store instructions within the memory transaction;

wherein the determining includes the transactional memory logic determining whether the target address of the speculative memory access request matches an address in the set of addresses in the store footprint of the memory transaction by reference to the directory.

2. The method of claim 1, wherein the speculative memory access request is a load request.

3. The method of claim 1, wherein the speculative memory access request comprises a data prefetch request.

4. The method of claim 1, wherein:
the determining includes determining whether the speculative memory access request is a transactional speculative memory access request or a non-transactional speculative memory access request;
causing the cache memory to reject servicing the speculative memory access request comprises causing the cache memory to reject servicing the speculative memory access request in response to determining the memory access request is a transactional speculative memory access request; and
the method further comprises failing the memory transaction in response to determining the speculative memory access request is a non-transactional speculative memory access request.

5. The method of claim 1, wherein:
the determining includes determining whether the speculative memory access request is a transactional speculative memory access request or a non-transactional speculative memory access request;
causing the cache memory to reject servicing the speculative memory access request comprises causing the cache memory to reject servicing the speculative memory access request in response to determining the memory access request is a non-transactional speculative memory access request; and
the method further comprises failing the memory transaction in response to determining the speculative memory access request is a transactional speculative memory access request.

6. The method of claim 1, wherein:
the memory transaction is a second memory transaction;
the target address is a second target address;
the method further comprises:
in response to receiving at the cache memory a non-speculative transactional load request of a first memory transaction, the non-speculative transactional load request including a first target address that matches an address already in the set of addresses forming the store footprint of the second memory transaction, the transactional memory logic failing the first memory transaction.

7. The method of claim 1, wherein:
the memory transaction is performed by a first hardware thread; and
the speculative memory access request is performed by a second hardware thread.

8. A method of data processing in a data processing system, the method comprising:
at a cache memory of a data processing system, receiving a speculative memory access request, the speculative memory access request including a target address of data speculatively requested for a processor core;
in response to receipt of the speculative memory access request, transactional memory logic determining whether the target address of the speculative memory access request matches an address in a set of addresses forming a store footprint of a memory transaction;
in response to determining that the target address of the speculative memory access request matches an address in the set of addresses forming the store footprint of & the memory transaction, the transactional memory logic causing the cache memory to reject servicing the speculative memory access request; and
the transactional memory logic determining whether the speculative memory access request is a transactional speculative memory access request or a non-transactional speculative memory access request;
wherein the transactional memory logic causes the cache memory to selectively reject servicing the speculative memory access request further based on the determining of whether the speculative memory access request is a transactional speculative memory access request or a non-transactional speculative memory access request.

9. The method of claim 8, wherein the speculative memory access request is a load request.

10. The method of claim 8, wherein the speculative memory access request comprises a data prefetch request.

11. The method of claim 8, wherein:
causing the cache memory to reject servicing the speculative memory access request comprises causing the cache memory to reject servicing the speculative memory access request in response to determining the memory access request is a transactional speculative memory access request; and
the method further comprises failing the memory transaction in response to determining the speculative memory access request is a non-transactional speculative memory access request.

12. The method of claim 8, wherein:
causing the cache memory to reject servicing the speculative memory access request comprises causing the cache memory to reject servicing the speculative memory access request in response to determining the memory access request is a non-transactional speculative memory access request; and
the method further comprises failing the memory transaction in response to determining the speculative memory access request is a transactional speculative memory access request.

13. The method of claim 8, wherein:
the memory transaction is a second memory transaction;
the target address is a second target address;

the method further comprises:

in response to receiving at the cache memory a non-speculative transactional load request of a first memory transaction, the non-speculative transactional load request including a first target address that matches an address already in the set of addresses forming the store footprint of the second memory transaction, the transactional memory logic failing the first memory transaction.

14. The method of claim 8, wherein:

the memory transaction is performed by a first hardware thread; and the speculative memory access request is performed by a second hardware thread.

* * * * *